United States Patent
Thirumalai (10) Patent No.: US 11,343,512 B1
(45) Date of Patent: May 24, 2022

(54) SYSTEMS AND METHODS FOR COMPRESSION WITH CONSTRAINT ON MAXIMUM ABSOLUTE ERROR

(71) Applicant: Samsung Display Co., Ltd., Yongin-si (KR)

(72) Inventor: Vijayaraghavan Thirumalai, Fremont, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/235,870

(22) Filed: Apr. 20, 2021

Related U.S. Application Data (60) Provisional application No. 63/135,462, filed on Jan. 8, 2021.

(51) Int. Cl.
| | |
|---|---|
| *H04N 19/147* | (2014.01) |
| *H04N 19/65* | (2014.01) |
| *H04N 19/19* | (2014.01) |
| *H04N 19/172* | (2014.01) |
| *H04N 19/426* | (2014.01) |

(52) U.S. Cl.
CPC ......... *H04N 19/147* (2014.11); *H04N 19/172* (2014.11); *H04N 19/19* (2014.11); *H04N 19/426* (2014.11); *H04N 19/65* (2014.11)

(58) Field of Classification Search
CPC ...... H04N 19/147; H04N 19/65; H04N 19/19; H04N 19/172; H04N 19/426
See application file for complete search history.

(56) References Cited

U.S. PATENT DOCUMENTS

| | | | |
|---|---|---|---|
| 9,866,853 B2 | 1/2018 | Thirumalai et al. | |
| 9,967,585 B2 | 5/2018 | Thiesse et al. | |
| 2008/0112481 A1* | 5/2008 | Hsaing | H04N 19/109 375/240.03 |
| 2010/0303354 A1* | 12/2010 | Reznik | G06K 9/4642 382/168 |
| 2010/0310174 A1* | 12/2010 | Reznik | G06K 9/4642 382/190 |
| 2015/0281689 A1* | 10/2015 | Henry | H04N 19/117 375/240.12 |
| 2016/0360237 A1 | 12/2016 | Said et al. | |

(Continued)

OTHER PUBLICATIONS

Azimi, M., et al., Rate-Distortion Optimization for High Dynamic Range Video Coding, IEEE, 2014, 4 pages.

(Continued)

*Primary Examiner* — Mohammed S Rahaman
(74) *Attorney, Agent, or Firm* — Lewis Roca Rothgerber Christie LLP (57) ABSTRACT

Systems and methods for performing rate-distortion optimization includes receiving an original data corresponding to a block of an image frame, and identifying a reconstructed version of the original data that minimizes a cost function. The cost associated with a particular reconstructed version of the original data may be based on an encoding rate associated with the particular reconstructed version of the original data, and a distortion between the original data and the particular reconstructed version of the original data in response to a supremum norm of error between the original data and the particular reconstructed version of the original data being less than or equal to a threshold value.

20 Claims, 9 Drawing Sheets

(56) References Cited

U.S. PATENT DOCUMENTS

2020/0186808 A1    6/2020   Joshi et al.
2020/0296422 A1    9/2020   Zhu et al.
2021/0049791 A1*   2/2021   Yuan .................... G06T 9/00

OTHER PUBLICATIONS

Jacobson, Natan, et al., A new display stream compression standard under development in VESA, Qualcomm, Spie, 2017c, 12 pages.
Richardson, I. E., "The H.264 Advanced Video Compression Standard," Wiley, 2010, 349 pages.
Sullivan, G.J., et al., Rate-Distortion Optimization for Video Compression, IEEE, Jul. 15, 1998, 38 pages.
Thiesse, J-M., et al., Data Hiding of Motion Information in Chroma and Luma Samples for Video Compression, MMSP'10 IEEE International Workshop on Multimedia Signal Processing, Saint Malo, France, Nov. 2010, 5 pages.

* cited by examiner

SYSTEMS AND METHODS FOR COMPRESSION WITH CONSTRAINT ON MAXIMUM ABSOLUTE ERROR

CROSS-REFERENCE TO RELATED APPLICATION

This application claims priority to U.S. Provisional Patent Application No. 63/135,462 filed on Jan. 8, 2021, which is incorporated herein by reference in its entirety.

FIELD

The present application generally relates to rate-distortion optimization, and more particularly to systems and methods for compression with constraint on maximum absolute error.

BACKGROUND

Compression techniques are often utilized to reduce memory requirements. However, with lossy compression, quality of the reconstructed data may be prone to errors and inconsistencies depending on the encoding and decoding techniques and other factors. Therefore, techniques that provide maximum compression while maintaining the best reconstructed quality is desired.

SUMMARY

According to an embodiment a method for performing rate-distortion optimization is described. The method may include receiving an original data corresponding to a block of an image frame; and identifying a reconstructed version of the original data that minimizes a cost function. The cost associated with a particular reconstructed version of the original data may be based on an encoding rate associated with the particular reconstructed version of the original data, and a distortion between the original data and the particular reconstructed version of the original data in response to a supremum norm of error between the original data and the particular reconstructed version of the original data being less than or equal to a threshold value.

The cost associated with the particular reconstructed version of the original data may be a sum of the distortion and product of a Lagrangian parameter and the encoding rate.

A second cost associated with a second particular reconstructed version of the original data may be infinity in response to a second supremum norm of error between the original data and the second particular reconstructed version of the original data being greater than the threshold value.

The method may further include setting the threshold value to a second threshold value in response to the second supremum norm of error between the original data and the second particular reconstructed version of the original data being greater than the threshold value.

The method may further include setting the threshold value by: searching a search window for a first value that is greater than or equal to the supremum norm of the error; and setting the threshold value to the first value.

The search window may include a plurality of values in an ascending order.

The first value may be greater than a lower bound of the search window.

A lower bound of the search window may corresponds to a threshold value of a previous block of the image frame.

The supremum norm of error between the original data and the particular reconstructed version of the original data may be less than or equal to a threshold value, and reduces a maximum absolute error of the particular reconstructed version of the original data.

According to another embodiment, a method for performing rate-distortion optimization is described. The method may include receiving an original data corresponding to a block of an image frame; and identifying a reconstructed version of the original data that minimizes a cost function. A cost associated with a particular reconstructed version of the original data may be based on a distortion between the original data and the particular reconstructed version of the original data, an encoding rate associated with the particular reconstructed version of the original data, and a supremum norm of error between the original data and the reconstructed version.

The cost associated with the particular reconstructed version of the original data may be a sum of the distortion, and a product of a first Lagrangian parameters and the encoding rate, and a product of a second Lagrangian parameter and the supremum norm of error between the original data and particular reconstructed version of the original data.

According to another embodiment, an encoder system is described. The system may include: a memory storing computer-executable instructions; and a processor configured to execute the instructions and causes the system to perform operations including: receiving an original data corresponding to a block of an image frame; and identifying a reconstructed version of the original data that minimizes a cost function. The cost associated with a particular reconstructed version of the original data may be based on an encoding rate associated with the particular reconstructed version of the original data, and a distortion between the original data and the particular reconstructed version of the original data in response to a supremum norm of error between the original data and the particular reconstructed version of the original data being less than or equal to a threshold value.

The cost associated with the particular reconstructed version of the original data may be a sum of the distortion and product of a Lagrangian parameter and the encoding rate.

A second cost associated with a second particular reconstructed version of the original data may be infinity in response to a second supremum norm of error between the original data and the second particular reconstructed version of the original data being greater than the threshold value.

The processor may be further configured to execute the instructions and cause the system to perform operations including setting the threshold value to a second threshold value in response to the second supremum norm of error between the original data and the second particular reconstructed version of the original data being greater than the threshold value.

The system may further include a threshold calculator, wherein the processor may be further configured to execute the instructions and cause the threshold calculator to determine the threshold value.

The threshold calculator may be further configured to determine the threshold value by: searching a search window for a first value that is greater than or equal to the supremum norm of the error; and setting the threshold value to the first value.

The search window may include a plurality of values in an ascending order.

The first value is greater than a lower bound of the search window.

A lower bound of the search window may corresponds to a threshold value of a previous block of the image frame.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Embodiments of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

Hereinafter, example embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

Figure 1:
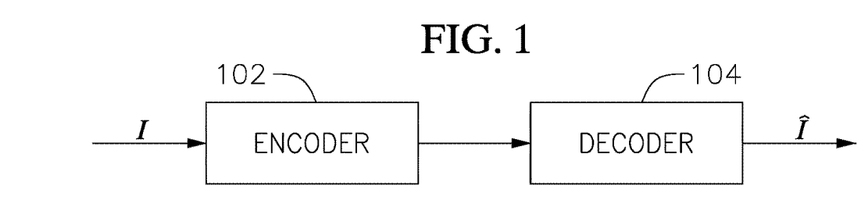
FIG. 1 is a block diagram of an encoder and a decoder, according to an embodiment.

Systems and methods for reducing visible effects from compression on a reconstructed image are disclosed. FIG. 1 illustrates an example block of an encoder 102 and decoder 104. The encoder 102 receives an image (I), encodes the image, and outputs the encoded image to the decoder 104. The decoder 104 then generates a reconstructed version (Î) of the original image based on the encoded image.

Some optimization techniques may seek to generate a reconstructed version (Î) of the original image that minimizes an error (E) between the original image (I) and a reconstructed version (Î) of the original image using the following formulas:

$$\hat{I} = \arg\min \|E\|_2^2 \text{ s.t. } R \le R_b$$

$$\hat{I} = \arg\min(D + \lambda R) \text{ where } D = \|E\|_2^2,$$

wherein: E is a difference between the original image (I) and the reconstructed version (Î) of the original image; $R_b$ is a bit budget (which may be based on compression ratio, available bandwidth between the encoder 102 and the decoder 104, a storage requirement, or a combination thereof); R is an encoding rate of the encoder 102; D is a distortion between the original image and the reconstructed image; and $\lambda \ge 0$ is Lagrangian parameter which balances the distortion and the bit rate.

Figure 2:
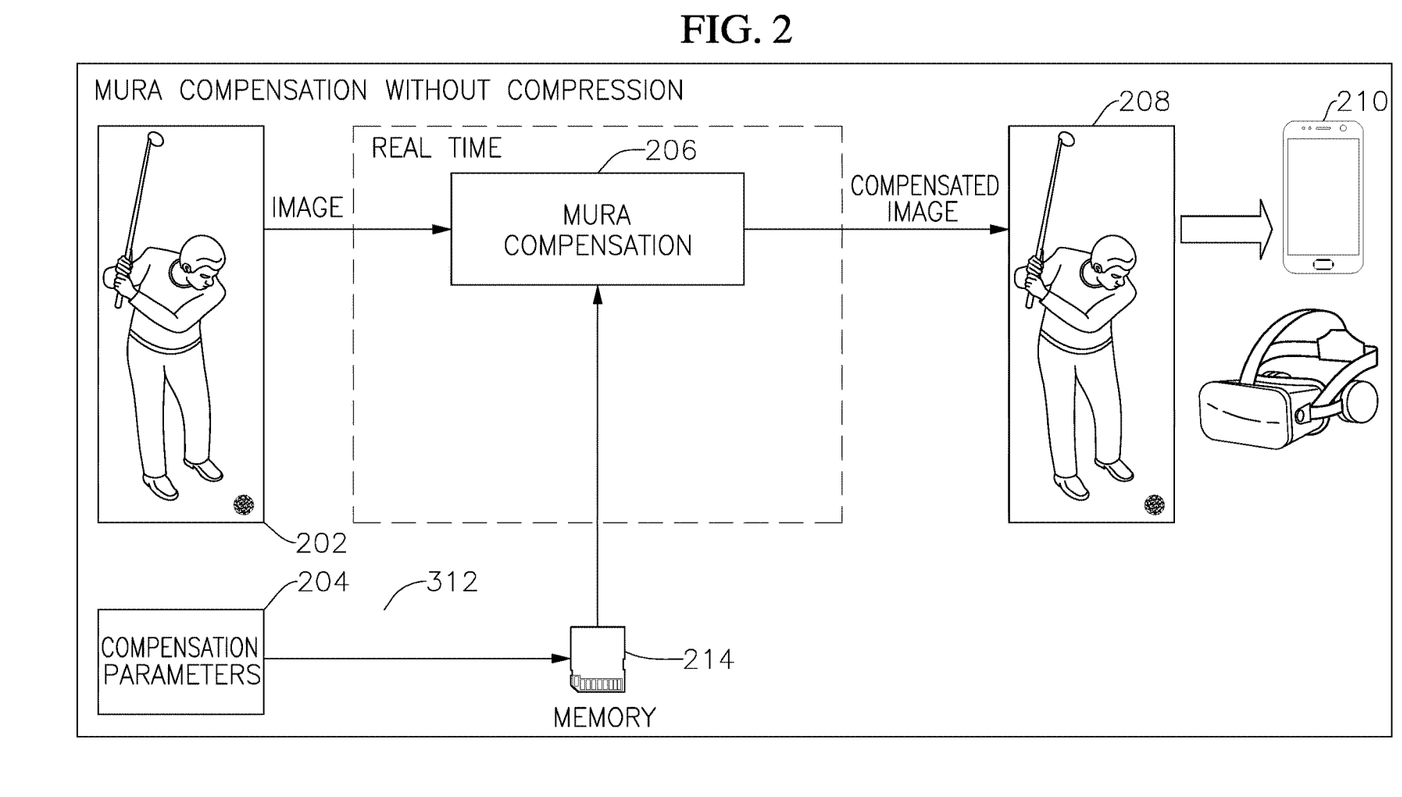
FIG. 2 is a block diagram of a mura compensation process, according to an embodiment.
Figure 3:
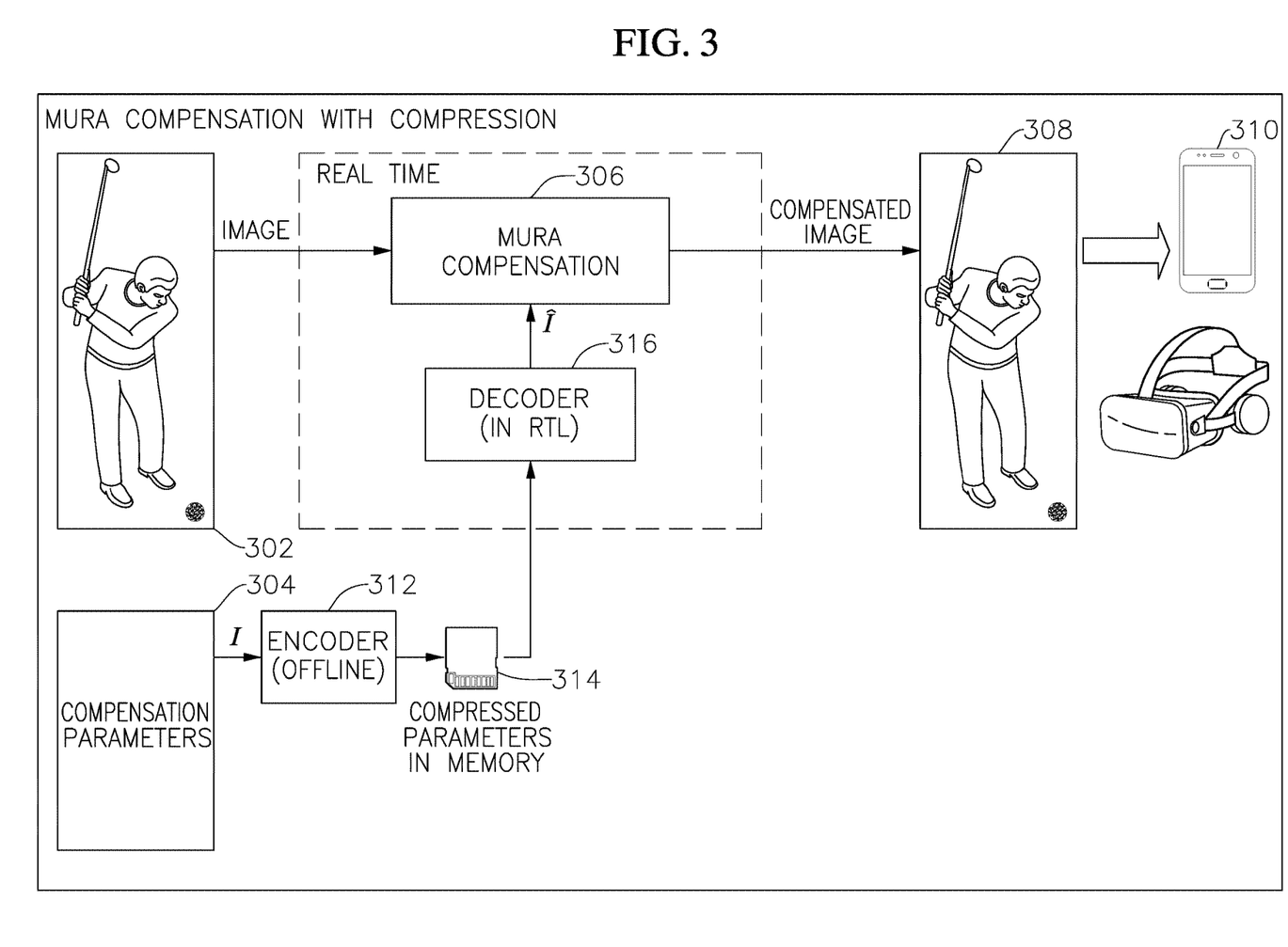
FIG. 3 is a block diagram of a mura compensation process with compression, according to an embodiment.

FIGS. 2-3 illustrate systems in which compensation parameters are applied to an original image to generate a compensated image. In the illustrated examples, the goal of generating the compensated image is to reduce mura defects with which displays may be prone to unless corrected. However, compensation techniques can be utilized in display devices to reduce other visual imperfections (e.g., ghosting, etc.)

Display devices are often prone to mura defects because while transistors and various electronic components that make up the pixels of the displays are manufactured according to closely inspected specifications within set manufacturing tolerances, no two components have an exact identical relationship. For example, the voltage-current relationships of two transistors in the display may differ slightly such that, responsive to a particular input code (e.g., input voltage), one pixel may turn on with a luminance corresponding to a grayscale value of 128, whereas another pixel may turn on with a luminance corresponding to a grayscale value of 127, while another pixel may turn on with a luminance corresponding to a grayscale value of 130, and so on. Moreover, these differences may vary from one display device to another. In other words, no two display devices are exactly the same. Accordingly, mura compensation techniques may be implemented to compensate for this visual impairment in display devices so that the pixel in every display device will behave more consistently (e.g., always turning on with a luminance corresponding grayscale value of 128).

In some embodiments, mura defects may be compensated by applying compensation parameters to an image to be displayed. A display device may adjust input values (e.g., input voltages, input codes, etc.) supplied to pixels of the display device based on the compensation parameter in order to achieve reduced mura defects. Because the compensation parameters are static parameters, the parameters may be determined and implemented during manufacturing of the display device, for example at the factory.

Accordingly, FIG. 2 illustrates a block diagram of an example mura compensation technique. According to an embodiment, an image 202 that is to be displayed on a display device 210 is compensated by applying compensation parameters 204 to an original image at the mura compensation block 206. The compensation parameters 204 are display dependent so the parameters are calculated specifically for each display device 210 and stored in memory 214. When the image 202 is to be displayed on the display device 210, the compensation parameters 204 may be retrieved from the memory 214 and applied to the image in real time to compensate for the mura defects.

However, the compensation parameters 204 can be memory intensive and take up a lot of memory space. Thus, in some embodiments, the compensation parameters 204 may be compressed and then stored in a memory to reduce the amount of memory needed to store the compensation parameters.

FIG. 3 illustrates a block diagram of an example mura compensation technique where the compensation parameters are compressed, according to an embodiment. Similar to FIG. 2, an image 302 that is to be displayed on a display device 310 is compensated by applying compensation parameters 304 at the mura compensation block 306 to compensate for mura defects. But differently from FIG. 2, the compensation parameters 304 are compressed by an encoder 312 and the compressed compensation parameters are stored in memory 314, and the compressed parameters stored in the memory 314 are decompressed by the decoder 316 before the mura compensation 306 takes place. Finally, the mura compensated image 308 may be displayed on the display device 310. In some embodiments, the encoder 312 and the decoder 316 may implement a transform-based low complexity codec (TLC), but is not limited thereto, and other encoding/decoding techniques may be implemented.

The embodiments of the present disclosure will be directed to rate distortion optimization techniques for the compensation parameters 304. According to an embodiment, the compensation parameters 304 may be represented as data I, and data I may be encoded (e.g., compressed) by encoder 312. The encoding may be performed offline, e.g., during the manufacturing of the display device 310 in a factory. Thus, in some embodiments, the encoding is performed just one time when the display device 310 is manufactured. In other embodiments, the encoding may be performed on an existing device, for example, during a configuration process initiated by an end user. Once the compensation parameters 304 represented by data I are compressed, the compressed data I may be stored in a memory 314, for example an onboard memory in the display device 310. During operation, the encoder 312 is not utilized because the encoded compensation parameters 304 are already stored in the memory 314.

In some embodiments, by encoding, thus compressing the data I, the size of the encoded parameters may be reduced thereby reducing the memory requirements or the amount of memory 314 needed to store such encoded parameters. In some embodiments, the memory requirements may be reduced by four times or eight times.

In some embodiments, the encoded parameters may be retrieved from the memory 314 and decoded by a decoder 316 (e.g., decompressed) such that a reconstructed version ($\hat{I}$) of the data may be provided to the mura compensation block 306. In some embodiments, the decoder 316 may be implemented in a hardware such as, for example field-programmable gate logic (FPGA) or application specific integrated circuit (ASIC). Yet in other embodiments, the decoder may be implemented by programming software.

Rate distortion optimization of compensation parameters corresponding to an image is different from rate distortion optimization of an image. For example, when decoding an encoded image (e.g., a video image), the decoded image, which is a reconstructed version of the original image, is shown to an end user (e.g., on the display). Thus, when performing rate distortion optimization in the case of a reconstructed image, it may be desirable to increase (e.g., maximize) the peak signal to noise ratio (PSNR) to reduce or minimize the mean squared error, for example, as is typically done in video coding formats such as MPEG.

On the other hand, when decoding encoded compensation parameters (e.g., to compensate for mura defects), the decoded data, which is a reconstructed version of the original compensation parameter data, is not shown to the end user because the reconstructed data is just parameters (e.g., offsets) that are used for mura defect compensation. Instead, the end user sees an image that is compensated by the reconstructed compensation parameters. Therefore, when performing rate distortion optimization in the case of reconstructed compensation parameters, increasing (e.g., maximizing) the PSNR alone may not provide the best results (e.g., the best reconstructed compensation parameters). Therefore, according to an embodiment, in addition to increasing (e.g., maximizing) the PSNR, techniques to reduce (e.g., minimize) an error between the original compensation parameters and the reconstructed version of the compensation parameters may be implemented, thereby reducing a maximum absolute error. Hereinafter, the compensation parameters may also be referred to as "data."

In some embodiments, methods for optimizing a framework to reduce the maximum absolute error is described without sacrificing (e.g., while increasing) the PSNR. In some embodiments, methods to reduce the maximum absolute error is determined without increasing the amount of time it takes to encode the data.

In some embodiments, systems and methods are described to include a supremum norm in the rate distortion optimization to reduce the maximum absolute error ($\|E\|_\infty$). The disclosed systems and methods identify a reconstructed version ($\hat{I}$) of the original data according to the following equation:

$$\hat{I} = \arg\min \|E\|_2^2 \text{ s.t. } R \leq R_b, \|E\|_\infty \leq \tau$$

where $\tau$ is a threshold and $\|E\|_\infty$ is a supremum norm of error between the original data (I) and the reconstructed version ($\hat{I}$) of the original data.

In some embodiments, a modified constrained problem with Lagrangian parameter $\lambda$ may be used:

$$\hat{I} = \arg\min(D + \lambda R), \text{ s.t. } \|E\|_\infty \leq \tau \text{ where } D = \|E\|_2^2$$

wherein the cost, $D + \lambda R$, is set to $D + \lambda R = \infty$ when $\tau > \|E\|_\infty$. Here, $\tau > \|E\|_\infty$ is the supremum norm constraint. In yet another embodiment, the distortion may be calculated based on a sum of absolute difference such that:

$$\hat{I} = \arg\min(D + \lambda R), \text{ s.t. } \|E\|_\infty \leq \tau \text{ where } D = \|E\|_1$$

Embodiments of the present disclosure provides two methods for enforcing the supremum norm constraint by determining $\tau$.

Figure 4:
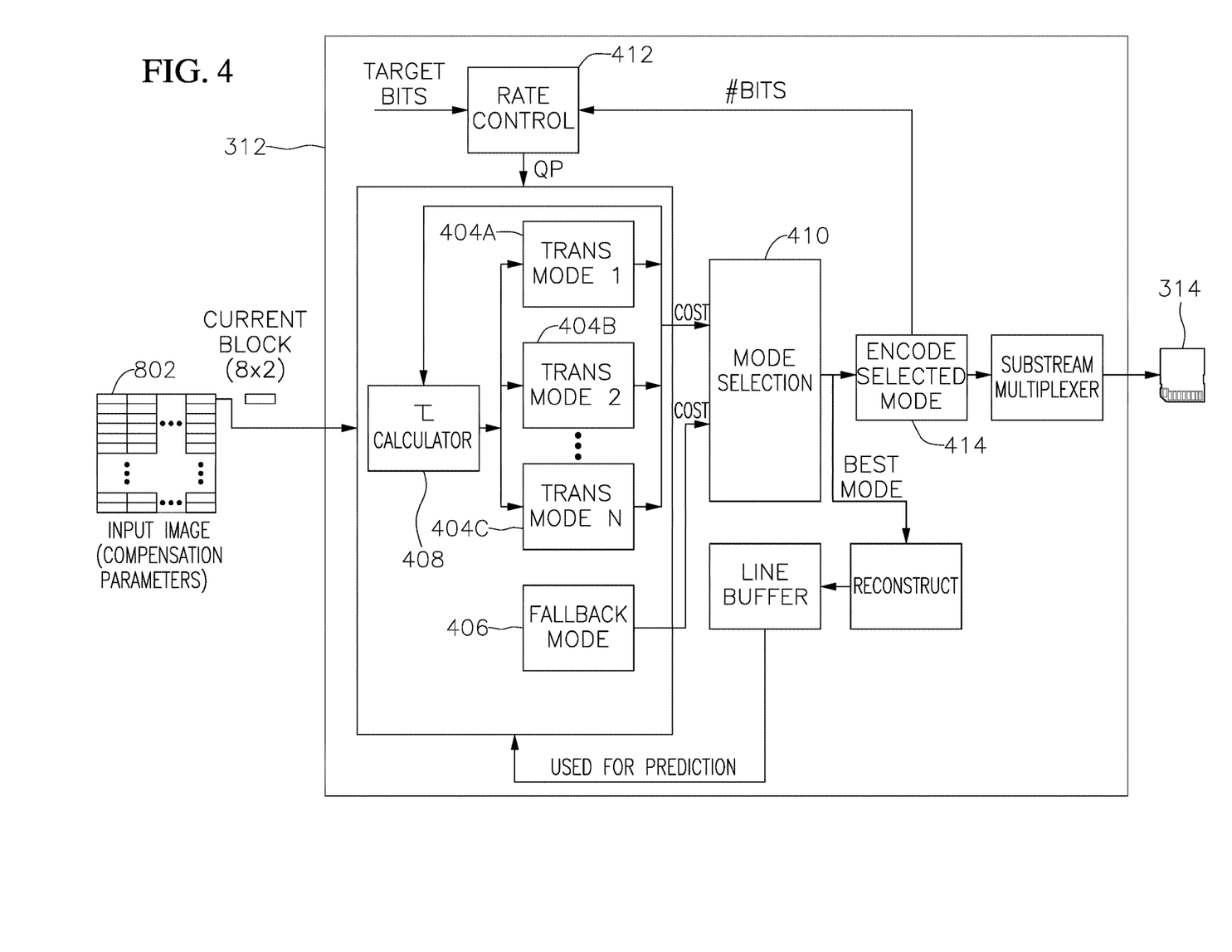
FIG. 4 is a block diagram of an encoder, according to an embodiment.

FIG. 4 is a block diagram of an example encoder 312 illustrated in FIG. 3. According to an embodiment, the encoder 312 is configured to take compensation parameters corresponding to each block of the image 802 and encode it according to one of several possible modes (e.g., transform modes), based on a first cost calculation method (e.g., rate distortion optimization), which will be described in more detail with reference to FIG. 5.

In some embodiments, the encoder 312 includes a $\tau$ calculator 408 that provides a threshold input value $\tau$ to the two or more transform modes 404A-404C and a fallback mode 406. The output from the transform modes 404A-404C and fallback mode 406 are provided to mode selection 410 where one of the cost outputs from the transform modes 404A-404C and the fallback mode 406 is selected. In some embodiments, the $\tau$ calculator 408 sets the threshold value τ that is applied to the transform modes 404A-404C, which will be used to determine whether the cost passes or fails (e.g., whether a constraint enforced by the supremum norm of error is less than or equal to the threshold value τ). Consequently, when a threshold value τ is found that satisfies (i.e., passes) the constraints for one of the modes, mode selection 410 selects the mode (e.g., one of transform modes 404A-404C) with the lowest cost. On the other hand, if a threshold value τ does not satisfy (i.e., fails) the constraints for the modes, then feedback may be provided to the τ calculator 408 to selected another τ value (e.g., the next higher value), and then provide the updated τ value to the transform modes 404A-404C to determine whether the updated τ value satisfies the constraints for at least one of the modes. That mode that satisfies the constraint may be selected, in in the case where multiple modes satisfy the constraint, then the mode with the lowest cost may be selected. In some embodiments, if no τ values, including the updated τ values, satisfies the constraints, then the mode selection 410 may select the fallback mode 406.

In some embodiments, encoder 312 includes a plurality of transform modes 404A-404C that may perform a spatial intra prediction of the compensation parameters corresponding to a block of the image 402. According to one example, a vertical intra prediction mode may be performed. In another example, a horizontal intra prediction mode may be performed. Accordingly, different prediction of the compensation parameters may be generated from each of the different transform modes. The original compensation parameter may then be subtracted from the prediction by each of the transform modes to generate a residue. After generating the residue, a discrete cosine transform (DCT) may be performed such as the one used in JPEG or H.264. In another embodiment, a discrete sine transform (DST) may be performed such as the one used in HEVC. After applying the transform, the current block is quantized using a quantization parameter, and a coding rate to represent the quantized coefficients is calculated.

In some embodiments, an encoder may include two or more transform modes, such as for example, eight transform modes 404A-404C as shown in FIG. 4. Accordingly, the current block may be approximated or reconstructed in eight different ways by the eight different transform modes 404A-404C and the transform mode the generates the best output, based on the distortion between the original and the approximated/reconstructed block, rate (e.g., amount of bits used to represented the quantized transform coefficients), and the threshold value τ, may be selected by mode selection 410. Moreover, the selected transform mode may vary from block to block of the image 402. Thus, in one example, transform mode 1 404A may best approximate the first block but transform mode 2 404B may best approximate the second block, and so on. In some embodiments, the desirable residue may be the one that gives the smallest distortion, the smallest rate, and the smallest or a combination thereof.

In some embodiments, a fallback mode 406 may have fixed rate compression and may be utilized when the transform mode 404A-404C is expensive or the encoder is about to run out of bits. In the fallback mode 706, an upfront memory size may be fixed and therefore the compensation parameters may be compressed to fit in to the fixed memory size. Therefore, exceeding the memory capacity even by one bit may result with an inability to decode (e.g., reconstruct) the compensation parameters thus, completely losing the compensation parameters. Thus, using the fallback mode 406 is generally reserved for edgy cases or corner cases.

In some embodiments, the mode selection 410 selects the best transform mode that increases (e.g., maximizes) the PSNR or reduces (e.g., minimizes) the supremum norm error for compensation parameters corresponding to each block of the image 402. In the example encoder 312 illustrated in FIG. 4, the mode selection 410 selects from either one of the transform modes 404A-404C or the fallback mode 406. As described earlier, because the probability of the fallback mode being used is very small (e.g., about 0.001% of the time), and because it is reserved mostly for edgy or corner cases, the mode selection 410 will select the transform mode 404 most of the time (e.g., about 99.999% of the time). Additionally, a bit budget may be calculated in the mode selection 410 to determine the fixed rate.

In some embodiments, the encoder 312 may include a rate controller 412. Target bits and a bit budget may be provided as inputs to the rate controller and depending on how far the encoding rate is from the target bits, the rate controller 412 may calculate a quantization parameter (QP). The QP may then be provided to the modes (e.g., transform modes 404A-404C or the fallback mode 406). Finally, the compensation parameters may be encoded at the encoding block 414 and then stored in memory 314.

In some encoding schemes, such as for example, VESA Display Compensation Mobile (VDC-M), the transform mode is used to encode a particular type of visual information, for example, using a transform mode to encode natural contents, or using a block prediction mode to encode screen content and synthetic patterns. In some embodiments, the fallback mode is used when the transform mode is expensive or an encoder is about to run out of bits.

In some embodiments, the supremum norm of error constraint is evaluated only in regular modes such as transform modes and block prediction modes. This is because fallback modes are used very rarely and when a fallback mode is used, the fallback mode typically has high distortion and at least one fallback mode is available per block.

Figure 5:
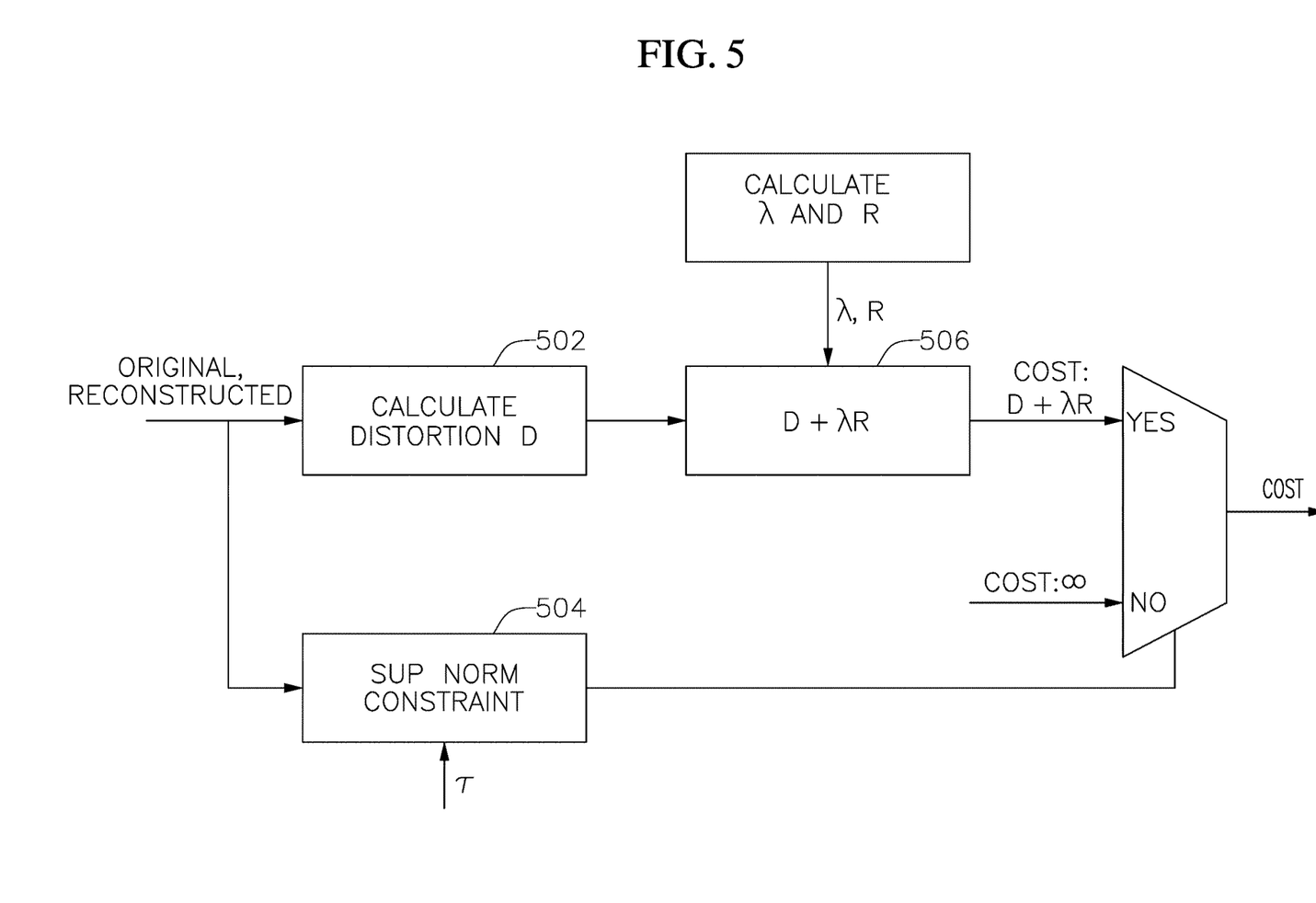
FIG. 5 illustrates a cost calculation technique according to a first method by the encoder, according to an embodiment.

FIG. 5 illustrates a cost calculation technique according to a first method by the encoder 312 illustrated in FIG. 4. More particularly, it illustrates the cost calculation performed by the transform modes 404A-404C of the encoder 312. Here, both the original and reconstructed data is used to calculate distortion D at block 502, and the cost associated with a particular reconstructed version (Î) of the original data is based on an encoding rate associated with the particular reconstructed version of the original data, and a distortion between the original data (I) and the particular reconstructed version (Î) of the original data. That is, cost may be calculated as the distortion D and λ times the rate R. λ may be computed, for example, according to one or more techniques known in the art:

$$\lambda = \alpha * 2^{((QP-\beta)/\gamma)} \text{ e.g., } \alpha=0.852, \beta=12, \gamma=3$$

as described in Iain E. Richardson. 2010. The H.264 Advanced Video Compression Standard (2nd. ed.). Wiley Publishing, or $$\lambda = a * 2\left(\frac{(BR*b)-c}{d}\right), \text{ where } BR = \frac{R}{\max \text{ Bits}}$$

as described in U.S. Pat. No. 9,866,853, "System and method for Lagrangian parameter calculation for display stream compression (DSC)." Here, a, b, c and d, are constants; R is the coding rate of the current block; and maxBits is the maximum bits to represent the current block. In some embodiments, the reconstructed data is generated based on encoding and then decoding the original data using the encoding technique selected by the mode selection 410 from the transform modes 404A-404C or the fallback mode 406 in the encoder 312 of FIG. 4.

However, according to an embodiment of the present disclosure, an additional constraint is incorporated into the cost, which enforces that the supremum norm of error between the original data and the particular reconstructed version of the original data being less than or equal to a threshold value $\tau$. In some embodiments, the supremum norm may be determined at the supremum norm block 504, by taking the absolute difference of the error and then taking the maximum value of the absolute difference. If the supremum norm is less than or equal to $\tau$, which may be provided from a $\tau$ calculator 408, then the current cost is accepted as D+$\lambda$R. If the supremum norm of error is greater than $\tau$, then the cost of the selected transform mode is set to infinity and therefore the coding mode is not used to encode the data for that particular value of $\tau$. However, as explained above with reference to FIG. 4, if the current value of $\tau$ does not satisfy the constraint, then feedback may be provided to the $\tau$ calculator 408 to get a different $\tau$ value (e.g., the next higher $\tau$ value) and determine whether this $\tau$ value will satisfy the constraint. If it does not, then this process may be repeated until a $\tau$ value that satisfies the constraints is found. If multiple $\tau$ values are determined to satisfy the constraint, then the $\tau$ value that generates that lowest cost may be selected. On the other than, if no $\tau$ values satisfy the constraint and no more $\tau$ values are left to be selected by the $\tau$ calculator, then the cost is set to infinity. Consequently, the current reconstruction version of the data is rejected for all transform modes. Thus, the first method provides a method of hard enforcement (e.g., a binary decision of accepting or rejecting) of the maximum absolute error by setting the cost of a coding method to infinity in response to the maximum absolute error associated with using the coding method exceeding a threshold $\tau$. When this occurs, the fallback mode may be selected.

Techniques for determining the value for $\tau$ will be described. In some embodiments, a brute force approach may be used to determine $\tau$. For example, the smallest threshold value $\tau$ from a search window S={1, 2, 3, ... T} may be determined that satisfies the supremum norm of error constraints for at least one of the transform modes 404A-404C, where:

$$\hat{t}=\arg\min\|E\|_2^2 \ s.t. \ R \leq R_b, \|E\|_\infty \leq \tau.$$

In other words, a search window S may be set, for example, from 1 to T, where 1 is a predetermined lower bound of the search window, T is a predetermined upper bound of the search window, and the values of the search window are provided in an ascending order. The objective is to find a threshold value $\tau$ from the search window that satisfies the supremum norm of error constraint. Thus, the threshold value $\tau$ may be the smallest value in the search window S (e.g., 1 in this case) and the cost (e.g., rate distortion optimization) may be calculated for each transform mode (e.g., transform modes 404A-404C in FIG. 4). If the constraint $\|E\|_\infty \leq \tau$ is not satisfied, then the next smallest value from S may be selected (e.g., 2 in this case) and the rate distortion optimization may be calculated. This process may be repeated for each block until a threshold value $\tau$ is determined for each block that meets all the constraints in the cost equation. In some embodiments, if every $\tau$ value fails to satisfy the constraints, then the fallback mode 406, that does not rely on a $\tau$ value may be selected.

Figure 6:
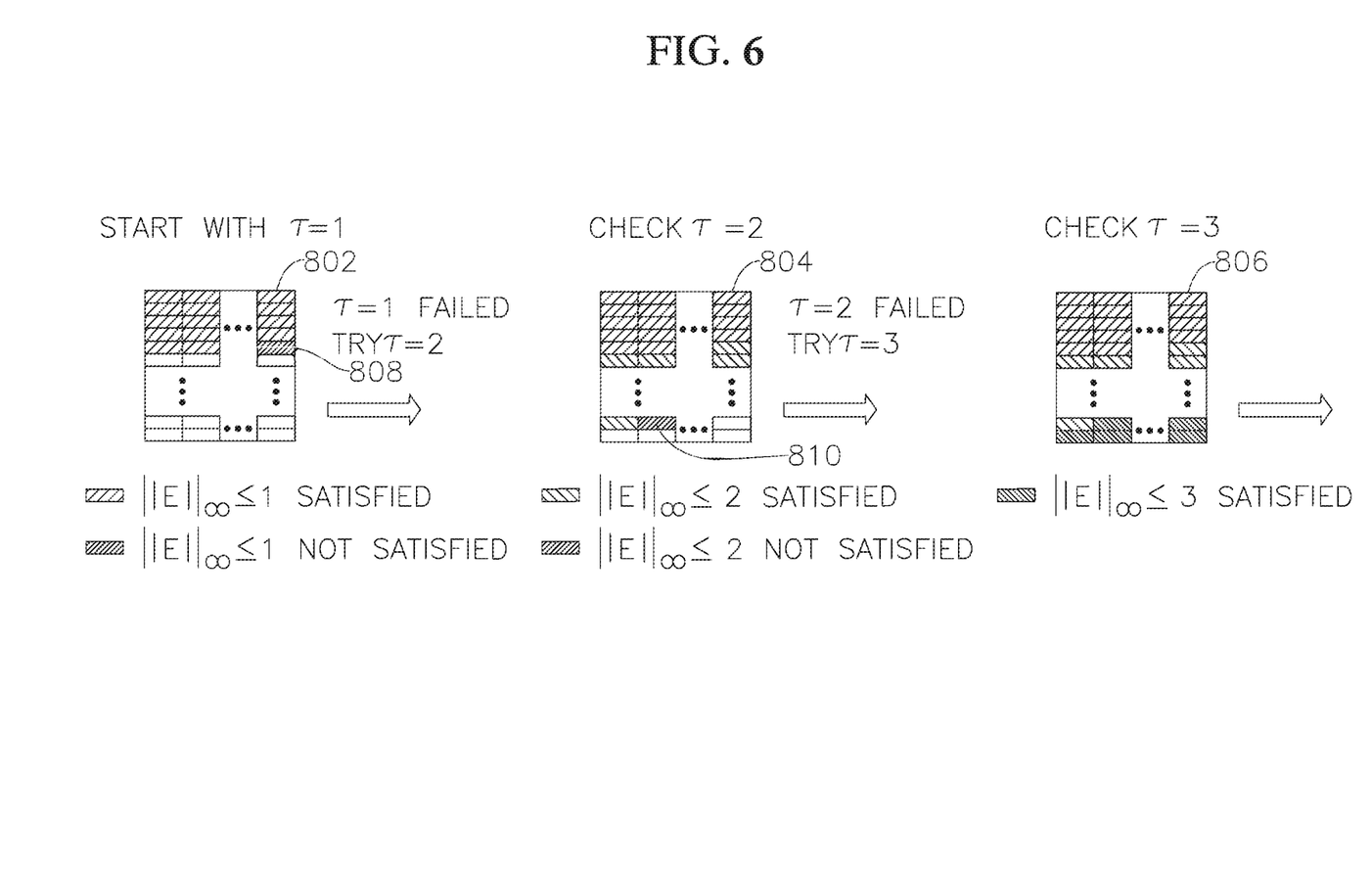
FIG. 6 illustrates a process of determining a threshold value, according to an embodiment.

FIG. 6 illustrates an example of an image frame that is divided into a plurality of blocks, for example, N×M blocks, and corresponding compensation parameters may be applied to each block of the image to correct for mura defects. In some embodiments, each block may comprise several pixels, for example, 16 pixels arranged in 2 rows and 8 columns. In other embodiments, each block may have more or fewer pixels. Thus, according to an example display that uses an RGB arrangement, each of the red, green, and blue blocks includes 16 pixels of red, green, and blue sub-pixels. In another embodiment that uses an RGBG arrangement (e.g., PENTILE® arrangement), each of the red and blue block include 8 sub-pixels of red and blue pixels, and the green block includes 16 pixels of green sub-pixels.

In some embodiments, brute force search may be performed for the compensation parameters for the blocks to determine the threshold value $\tau$ for the rate distortion optimization. According to an embodiment, the threshold value $\tau$ is set to the smallest value from the search window (e.g., 1) and the rate distortion optimization is solved for the first block according to the encoding techniques described above with reference to FIG. 4, where the best encoding solution is selected. Here, the first block is the uppermost left block. If the supremum norm of error is less than the threshold value $\tau$ based on the selected encoding technique (e.g., one of the transform modes 404A-404C), which is 1 in this example, then the first block passes and the cost for that block for the selected mode is D+$\lambda$R, and we move on to the next block. While the cost may pass for this threshold value $\tau$ at the selected mode, the cost may fail with the same threshold value with a different mode, in which case the cost may be infinity instead of D+$\lambda$R. Thus, the mode that best satisfies the constraint (e.g., also based on the smaller rate, smallest distortion, and smallest $\tau$) may be selected.

The next block is the next block to the right. The computation is repeated at this block and if the supremum norm of error is less than and equal to 1, then this block also passes, and the cost for this block is also D+$\lambda$R. Accordingly, this process is repeated for all of the blocks in a sequential order, from left to right, and then left to right in the next row below, and so on, until a block is reached where this computation fails to satisfy the constraints. That is, the supremum norm of error is greater than the threshold value $\tau$ (e.g., 1). Here, in the image frame 802, block 808 has failed. Therefore, the threshold value $\tau$ is set to the next smallest value from the search window S, for example, 2 in this case, and the rate distortion optimization equation is solved again starting from the first block at the top left, based on the brute force approach. Thus, the lower bound of the search window value may correspond to the threshold value $\tau$ of the previous block of the image frame. In some embodiments, the computation performed for each block includes a cost computation for each transform mode in the encoder. Thus, when the computation is said to fail for a block, all transform modes have failed.

However, the brute force approach may be inefficient, by recomputing the rate distortion optimization equation from the beginning. According to a more efficient approach, the rate distortion optimization equation does not have to be solved for the earlier blocks because those blocks have already passed with threshold value $\tau$=1. Thus, we know that those blocks will pass with larger threshold values (e.g., when $\tau$=2). Therefore, the rate distortion optimization equation may be solved using the larger threshold value $\tau$=2 starting at block 808, which is where the failure occurred when the smaller threshold value $\tau$=1 was used.

In this manner, the threshold value τ may be determined more efficiently according to the efficient approach Accordingly, with threshold value τ=2, the rate distortion optimization equation may be solved starting with block 808, and if this block passes, the next block is solved, and so on, until we reach a block where the supremum norm of error is greater than 2, and therefore fails. Here, the threshold value of τ=2 fails at block 810, as shown in image frame 804. Therefore, the threshold value τ is set to the next smallest value from the search window S, for example, 3 in this case, and the rate distortion optimization equation is solved starting with block 810, and if this block passes, the equation is solved for the next block, and so on until all of the blocks pass as shown in image frame 806. Thus, in this example, the threshold value τ may be set to 3.

In some embodiments, it may not be efficient to start the search by setting τ equal to the smallest search window value (e.g., lower bound of S, which is τ=1) if it is known that the smaller search window value will not pass all of the blocks. Accordingly, a binary search approach may be performed where the initial value for τ may be set to a higher value, for example, a value that is somewhere in the middle of the lower bound of the search window value and the upper bound of search window value (e.g., midpoint of the search window), knowing that the smaller threshold value τ will fail at some point. For example, if the search window S={1, 2, 3, 4, 5, . . . 100}, then the first threshold value τ may be set to start with 50. If τ=50 passes, then the lower half of the search window may be split, for example, by selecting τ=25, which is a value between 1 and 50 (i.e., lower half). On the other hand, if τ=50 fails, then the upper half of the search window may be split, for example, by selecting τ=75, which is a value between 50 and 100 (i.e., upper half). This process may be repeated until a τ value that passes is determined. Accordingly, time may be saved by not having to compute using every threshold value τ in the search window S, thereby improving the overall efficiency.

Accordingly, while the brute for approach is the simplest, it is not the most efficient, whereas the efficient approach and the binary search approach are more complex but are more efficient. For example, a display that has 1920 by 1080 pixel has approximately 129,600 blocks (or 2,073,600 pixels where each block has 2 rows by 8 columns of pixels). The complexity may be analyzed as a cardinality of search window S times the number of blocks (e.g., |S|*B=|S|*(N×M)), where S is the cardinality of the search window, B is the number of blocks, N is the number rows of blocks, and M is the number of columns of blocks. Therefore, the complexity of the efficient approach may be represented as O(B+|S|*B) but because the cardinality of the search window S is much less than B (e.g., |S|<<B), then O(B+|S|*B)=O(B)=O(N*M). Therefore, the complexity of the search may be substantially reduced to just O(N*M). On the other hand, the complexity of the brute force method is O(|S|*N*M), and the complexity of the binary search method is O(log 2(|S|*N*M).

Figure 7:
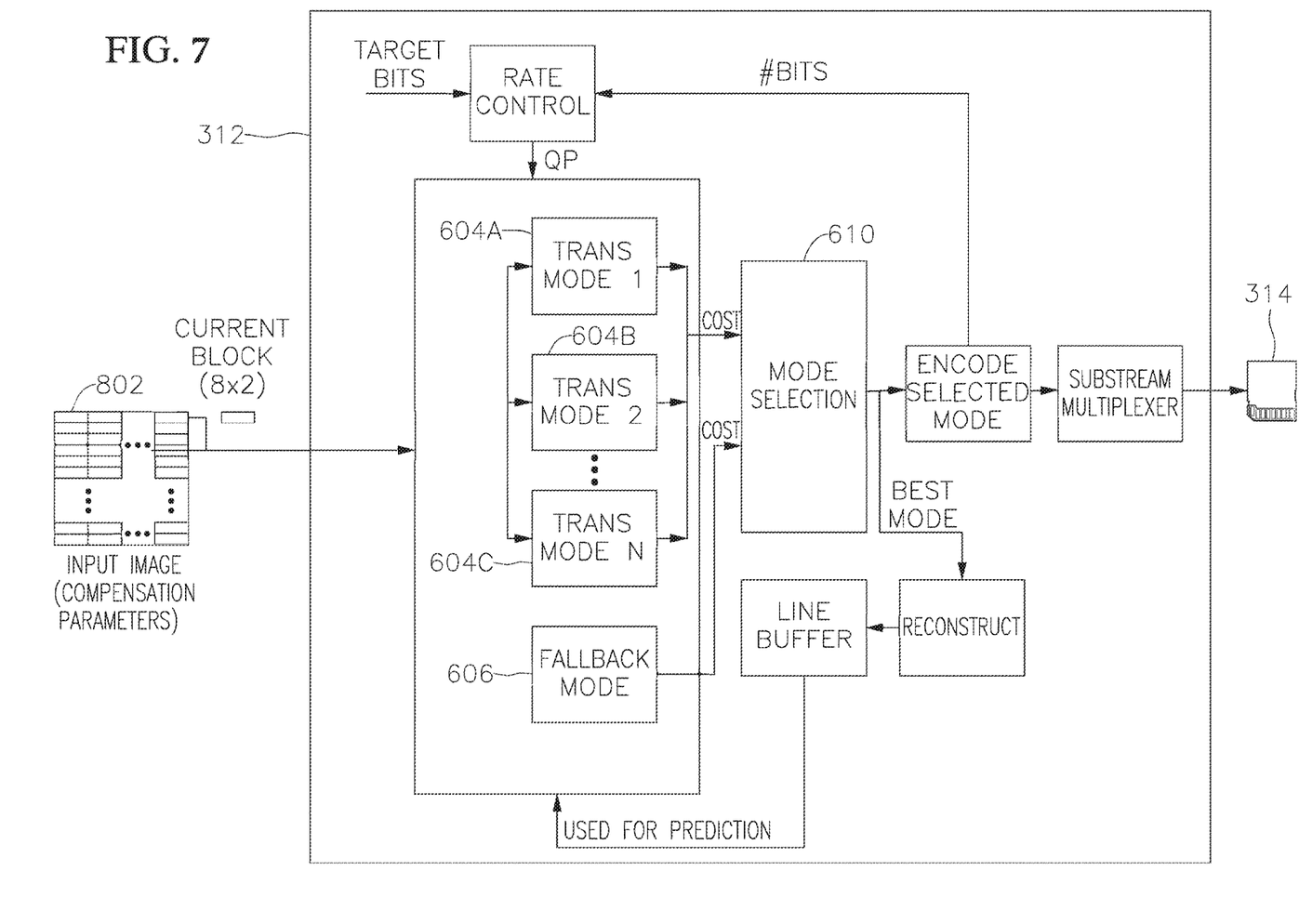
FIG. 7 is a block diagram of an encoder, according to another embodiment.

FIG. 7 is a block diagram of the encoder 312 similar to FIG. 4 but does not include the τ calculator, and may be utilized for encoding the compensation parameters according to a second method where the cost calculation includes the rate, distortion, and a supremum norm constraint, which will be described in more detail with reference to FIG. 8. In some embodiments, the encoder 312 includes two or more transform modes 604A-604C, similar to FIG. 4, where each transform mode may be configured to perform a spatial intra prediction of the compensation parameters corresponding to a block of the image 802. According to one example, a vertical intra prediction mode may be performed. In another example, a horizontal intra prediction mode may be performed. Accordingly, different prediction of the compensation parameters may be generated from each of the different transform modes. The original compensation parameter may then be subtracted from the prediction by each of the transform modes to generate a residue. After generating the residue, DCT or DST may be performed. After applying the transform the current block may be quantized using a quantization parameter and a coding rate to represent the quantized coefficients is calculated. Accordingly, a different prediction of the compensation parameters may be generated from each of the different transform modes and the cost may be calculated for each transform mode. The remaining blocks are substantially the same as those described with reference to FIG. 4 and will not be repeated here.

Figure 8:
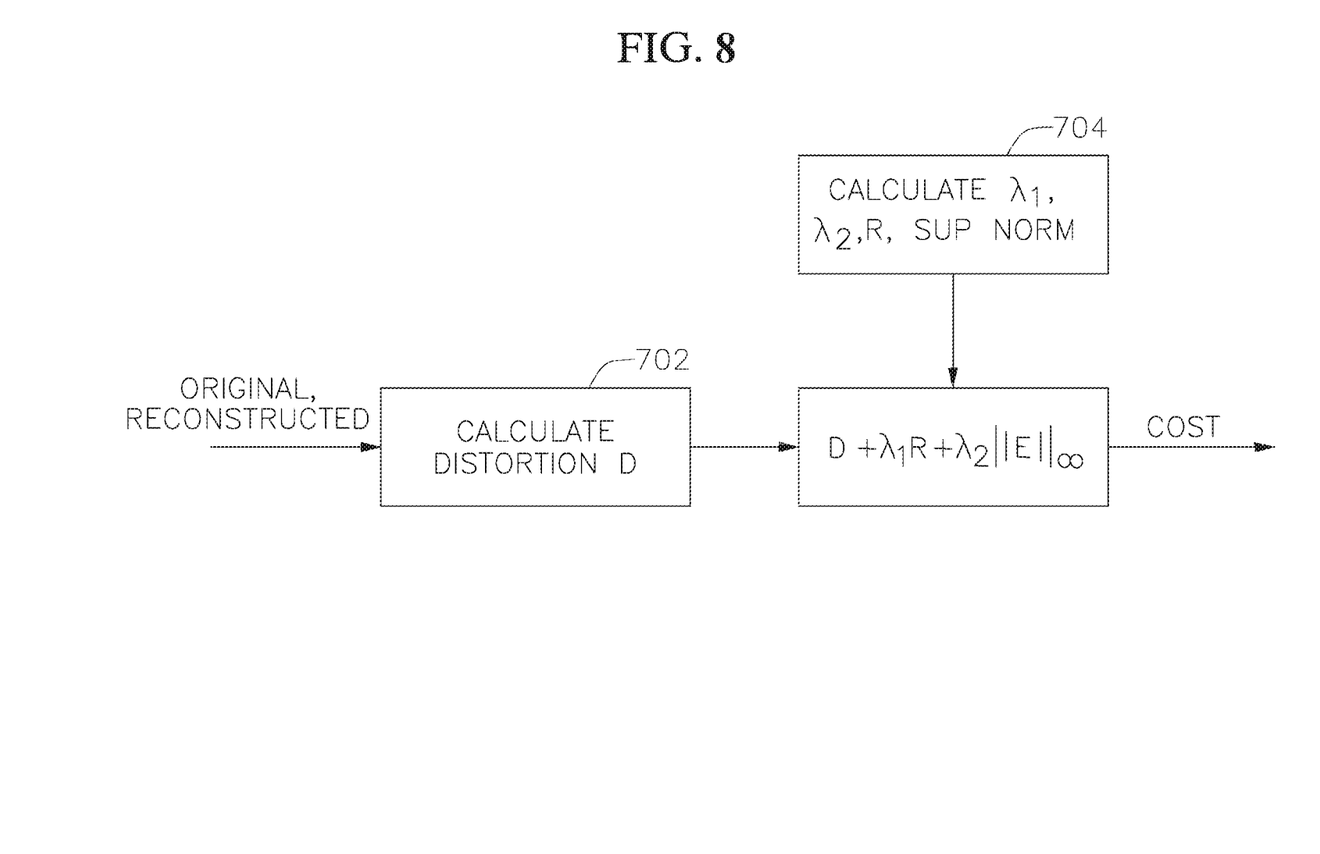
FIG. 8 illustrates a cost calculation technique according to a second method by the encoder, according to another embodiment.

FIG. 8 illustrates another cost calculation technique according to a second method by the encoder 312 illustrated in FIG. 7. More particularly, it illustrates the cost calculation performed by the transform modes 604A-604C of the encoder 312. The example encoder illustrated in FIG. 7 may include two or more units (e.g., eight units) of the cost calculation transform mode 604A-604C to perform the two or more cost calculations to select the best result. In some embodiments, the second method of determining the cost is provided by using two constraints, $\lambda_1$ and $\lambda_2$, and then converting the constraints to an unconstrained problem using the following equations:

$$\hat{I} = \arg\min(D + \lambda_1 R + \lambda_2 \|E\|_\infty), \text{ where } D = \|E\|_2^2$$

Here, $\lambda_1$ may be dependent on a quantization parameter or it may be computed using the same techniques for calculating as described above with reference to the first method. $\lambda_2$ may be computed through trial and error based on empirical or analytical error, and therefore may be an estimated value. For example, $\lambda_2$ may depend on a quantization parameter, and may be determined from an exponential equation wherein the $\lambda_2$ values are different from the values computed for $\lambda_1$. In some embodiments, $\lambda_2$ may depend on infinity norm ($\|E\|_\infty$). Thus, rate R and the supremum norm of error may be balanced using $\lambda_1$ and $\lambda_2$ to determine the cost according to the second method. As illustrated in FIG. 8, the reconstructed version of the original data may be provided to distortion calculator 702 to calculate distortion D. Here, the reconstructed version of the original data may be generated based on encoding and then decoding the original data using to the encoding technique selected by mode selection 610 from the transform modes 604A-604C in the encoder 312 of FIG. 7. $\lambda_1$ and $\lambda_2$ may be calculated at block 704 as described above, and the cost may be estimated in this manner. Therefore, because the absolute error is incorporated into the cost, the encoding with the lowest cost may have a reduced absolute error.

Figure 9:
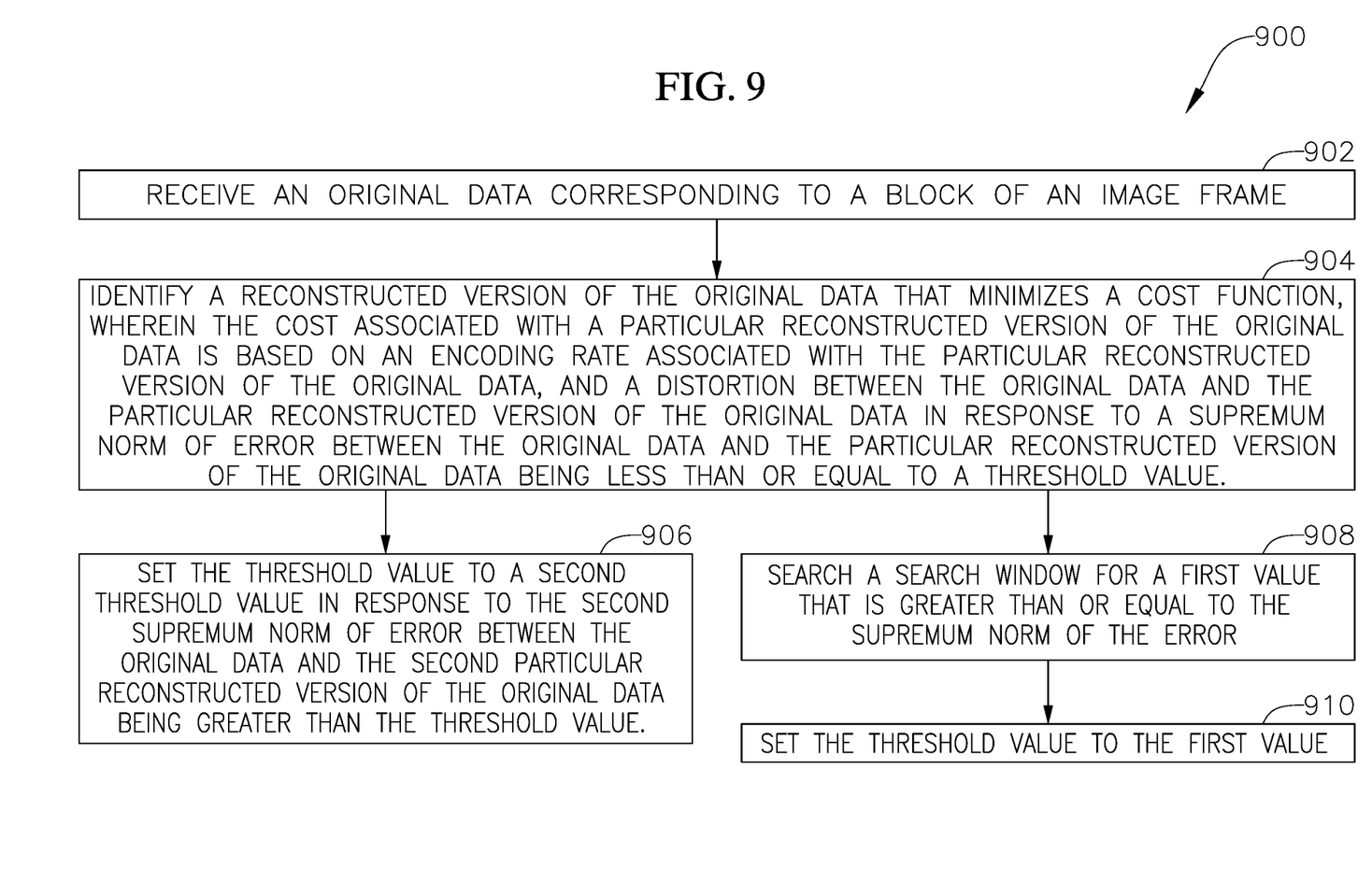
FIG. 9 is a flow chart of a method for encoding compensation parameters, according to an embodiment.

FIG. 9 is a flow chart of a method for encoding compensation parameters, according to an embodiment (900). According to the example embodiment, a method for performing rate-distortion optimization is described. The method may include receiving an original data (I) corresponding to a block of an image frame (902). In some embodiments, the method may further include identifying a reconstructed version (Î) of the original data that minimizes a cost function (904). The cost may be associated with a particular reconstructed version of the original data, and may be based on an encoding rate (R) that is associated with the particular reconstructed version of the original data, and a distortion (D) between the original data and the particular reconstructed version of the original data in response to a supremum norm of error between the original data and the particular reconstructed version of the original data being less than or equal to a threshold value (τ). In some embodiments, the method may further set the threshold value to a second threshold value in response to the second supremum norm of error between the original data and the second particular reconstructed version of the original data being greater than the threshold value (906). In some embodiments, the method may further search a search window (S) for a first value that is greater than or equal to the supremum norm of the error (908), and then set the threshold value to the first value (910).

Figure 10:
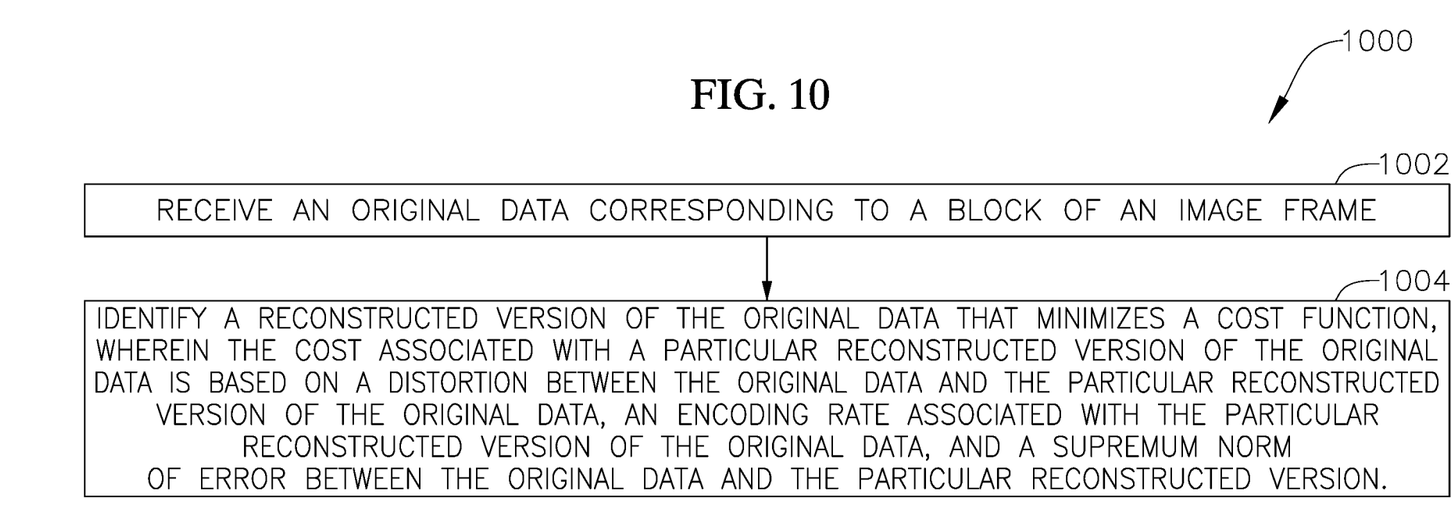
FIG. 10 is a flow chart of a method for encoding compensation parameters, according to another embodiment.

FIG. 10 is a flow chart of a method for encoding compensation parameters, according to another embodiment (1000). According to the example embodiment, another method for performing rate-distortion optimization is described. The method may include receiving an original data (I) corresponding to a block of an image frame (1002). In some embodiments, the method may further include identifying a reconstructed version ($\hat{I}$) of the original data that minimizes a cost function (1004). The cost may be associated with a particular reconstructed version of the original data, and may be based on a distortion (D) between the original data and the particular reconstructed version of the original data, an encoding rate (R) associated with the particular reconstructed version of the original data, and a supremum norm of error between the original data and the reconstructed version.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively.

The electronic or electric devices and/or any other relevant devices or components according to embodiments of the present invention described herein may be implemented utilizing any suitable hardware, firmware (e.g. an application-specific integrated circuit, or a field-programmable gate array), software, or a combination of software, firmware, and/or hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random-access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments described herein are examples only. One skilled in the art may recognize various alternative embodiments from those specifically disclosed. Those alternative embodiments are also intended to be within the scope of this disclosure. As such, the embodiments are limited only by the following claims and their equivalents.

What is claimed is:

1. A method for performing rate-distortion optimization, the method comprising:
receiving an original data corresponding to a block of an image frame;
identifying a reconstructed version of the original data that minimizes a cost function; and
setting a threshold value by:
searching a search window for a first value that is greater than or equal to a supremum norm of error between the original data and a particular reconstructed version of the original data; and
setting the threshold value to the first value,
wherein the cost associated with the particular reconstructed version of the original data is based on an encoding rate associated with the particular reconstructed version of the original data, and a distortion between the original data and the particular reconstructed version of the original data in response to the supremum norm of error being less than or equal to a threshold value.

2. The method of claim 1, wherein the cost associated with the particular reconstructed version of the original data is a sum of the distortion and product of a Lagrangian parameter and the encoding rate.

3. A method for performing rate-distortion optimization, the method comprising:
receiving an original data corresponding to a block of an image frame;
identifying a reconstructed version of the original data that minimizes a cost function,
wherein the cost associated with a particular reconstructed version of the original data is based on an encoding rate associated with the particular reconstructed version of the original data, and a distortion between the original data and the particular reconstructed version of the original data in response to a supremum norm of error between the original data and the particular reconstructed version of the original data being less than or equal to a threshold value, and
wherein a second cost associated with a second particular reconstructed version of the original data is infinity in response to a second supremum norm of error between the original data and the second particular reconstructed version of the original data being greater than the threshold value.

4. The method of claim 3, further comprising setting the threshold value to a second threshold value in response to the second supremum norm of error between the original data and the second particular reconstructed version of the original data being greater than the threshold value.

5. The method of claim 4, further comprising setting the threshold value by:
searching a search window for a first value that is greater than or equal to the supremum norm of the error; and
setting the threshold value to the first value.

6. The method of claim 1, wherein the search window comprises a plurality of values in an ascending order.

7. The method of claim 6, wherein the first value is greater than a lower bound of the search window.

8. The method of claim 7, wherein a lower bound of the search window corresponds to a threshold value of a previous block of the image frame.

9. The method of claim 1, wherein the supremum norm of error between the original data and the particular reconstructed version of the original data being less than or equal to a threshold value reduces a maximum absolute error of the particular reconstructed version of the original data.

10. A method for performing rate-distortion optimization, the method comprising:
receiving an original data corresponding to a block of an image frame;
identifying a reconstructed version of the original data that minimizes a cost function; and
wherein a cost associated with a particular reconstructed version of the original data is a sum of: a distortion between the original data and the particular reconstructed version of the original data, a product of a first Lagrangian parameter and an encoding rate associated with the particular reconstructed version of the original data, and a product of a second Lagrangian parameter and a supremum norm of error between the original data and the reconstructed version.

11. An encoder system comprising:
a memory storing computer-executable instructions; and
a processor configured to execute the instructions and causes the system to perform operations comprising:
receiving an original data corresponding to a block of an image frame;
identifying a reconstructed version of the original data that minimizes a cost function; and
setting a threshold value by:
searching a search window for a first value that is greater than or equal to a supremum norm of error between the original data and a particular reconstructed version of the original data; and
setting the threshold value to the first value,
wherein the cost associated with the particular reconstructed version of the original data is based on an encoding rate associated with the particular reconstructed version of the original data, and a distortion between the original data and the particular reconstructed version of the original data in response to the supremum norm of error being less than or equal to a threshold value.

12. The system of claim 11, wherein the cost associated with the particular reconstructed version of the original data is a sum of the distortion and product of a Lagrangian parameter and the encoding rate.

13. An encoder system comprising:
a memory storing computer-executable instructions; and
a processor configured to execute the instructions and causes the system to perform operations comprising:
receiving an original data corresponding to a block of an image frame;
identifying a reconstructed version of the original data that minimizes a cost function; and
wherein the cost associated with a particular reconstructed version of the original data is based on an encoding rate associated with the particular reconstructed version of the original data, and a distortion between the original data and the particular reconstructed version of the original data in response to a supremum norm of error between the original data and the particular reconstructed version of the original data being less than or equal to a threshold value, and
wherein a second cost associated with a second particular reconstructed version of the original data is infinity in response to a second supremum norm of error between the original data and the second particular reconstructed version of the original data being greater than the threshold value.

14. The system of claim 13, wherein the processor is further configured to execute the instructions and cause the system to perform operations comprising setting the threshold value to a second threshold value in response to the second supremum norm of error between the original data and the second particular reconstructed version of the original data being greater than the threshold value.

15. The system of claim 11, wherein the processor is further configured to execute the instructions to initiate determination of the threshold value.

16. The system of claim 13, wherein the processor is further configured to execute the instructions to initiate determination of the threshold value by:
   searching a search window for a first value that is greater than or equal to the supremum norm of the error; and
   setting the threshold value to the first value.

17. The system of claim 11, wherein the search window comprises a plurality of values in an ascending order.

18. The system of claim 17, wherein the first value is greater than a lower bound of the search window.

19. The system of claim 17, wherein a lower bound of the search window corresponds to a threshold value of a previous block of the image frame.

20. The method of claim 1, wherein the original data comprises compensation parameters to compensate for mura defects in a display device, and the reconstructed version of the original data comprises reconstructed version of the compensation parameters.

* * * * *